(12) United States Patent
Pan

(10) Patent No.: US 10,591,987 B2
(45) Date of Patent: Mar. 17, 2020

(54) METHOD, VIRTUAL REALITY APPARATUS AND RECORDING MEDIUM FOR FAST MOVING IN VIRTUAL REALITY

(71) Applicant: HTC Corporation, Taoyuan (TW)

(72) Inventor: Sheng-Yang Pan, Taoyuan (TW)

(73) Assignee: HTC Corporation, Taoyuan (TW)

( * ) Notice: Subject to any disclaimer, the term of this patent is extended or adjusted under 35 U.S.C. 154(b) by 206 days.

(21) Appl. No.: 15/343,222

(22) Filed: Nov. 4, 2016

(65) Prior Publication Data

US 2018/0129277 A1    May 10, 2018

(51) Int. Cl.
| | | |
|---|---|---|
| *G09G 5/00* | (2006.01) | |
| *G06F 3/01* | (2006.01) | |
| *A63F 13/5258* | (2014.01) | |
| *A63F 13/5255* | (2014.01) | |
| *A63F 13/428* | (2014.01) | |
| *A63F 13/213* | (2014.01) | |
| *G06T 3/20* | (2006.01) | |

(52) U.S. Cl.
CPC ............ *G06F 3/012* (2013.01); *A63F 13/213* (2014.09); *A63F 13/428* (2014.09); *A63F 13/5255* (2014.09); *A63F 13/5258* (2014.09); *G06T 3/20* (2013.01); *A63F 2300/8082* (2013.01)

(58) Field of Classification Search
CPC ........... A63F 13/213; A63F 2300/8082; G06F 3/012; G06T 3/20
See application file for complete search history.

(56) References Cited

U.S. PATENT DOCUMENTS

| | | | | |
|---|---|---|---|---|
| 2010/0240454 A1* | 9/2010 | Xiao | ...................... | A63G 21/20 463/30 |
| 2014/0368424 A1* | 12/2014 | Choi | ...................... | G06F 3/015 345/156 |
| 2016/0240009 A1* | 8/2016 | Lyren | ...................... | H04R 1/00 |

FOREIGN PATENT DOCUMENTS

CN          105705210          6/2016

OTHER PUBLICATIONS

"Office Action of Taiwan Counterpart Application," dated Apr. 17, 2017, p. 1-p. 7, in which the listed reference was cited.

* cited by examiner

*Primary Examiner* — Insa Sadio

(74) *Attorney, Agent, or Firm* — JCIPRNET

(57) ABSTRACT

A method, a virtual reality (VR) apparatus and a recording medium for fast moving in a virtual reality are provided. The method is applicable to a VR apparatus including a head-mounted display (HMD), a locator and a calculation device. In the method, the calculation device executes an application of the VR to display frames of the application on the HMD. Then, the calculation device detects a moving direction of a user wearing the HMD in a three-dimensional space by using the locator. Afterwards, the calculation device fast moves a field of view of the frames from a current location toward the moving direction.

9 Claims, 2 Drawing Sheets

METHOD, VIRTUAL REALITY APPARATUS AND RECORDING MEDIUM FOR FAST MOVING IN VIRTUAL REALITY

FIELD OF THE INVENTION

The invention is directed to a virtual reality (VR) method and a VR apparatus, and more particularly, to a method, a VR apparatus, and a recording medium for fasting moving in VR.

DESCRIPTION OF RELATED ART

VR refers to a technique for generating a virtual world in a three-dimensional (3D) space by utilizing computer simulation technology. The virtual world is constituted by computer graphics. By displaying frames on a head-mounted display (HMD) worn by a user in combination with sensors disposed on the user's body or in the surroundings, a vision-based artificial environment combined with perceptions, such as auditory sense and tactile sense, can be provided. The user experiencing the VR can not only visually have a sense like being immersed in the virtual world, but also move in the virtual world, or even interact with objects in the virtual world as in the real world.

The virtual world that can be seen by the user wearing the HMD is usually much larger than an actual space where he/she is. In a conventional game, the user can at most change the frames in response to head rotation, but have to use a joystick to move. To act in such a virtual space, the user's visual perception is not consistent with the body perception, which leads to dizziness easily. Even though a locator is used for space locating, the user's activity space is still limited by the room size, and the user has to use the joystick to move with a large scale in the virtual world. Eventually, it still turns out that the visualization and the body perceptions of the user cannot be consistent, which results in dizziness of different degrees to the user especially when the frames move fast.

SUMMARY

The invention provides a method, a virtual reality (VR) apparatus and a recording medium for fast moving in VR, capable of preventing or mitigating dizziness when frames move fast by detecting a moving direction of a user and applying the detected moving direction to the movement of the frames.

A method for fast moving in VR of the invention is applicable to a VR apparatus including a head-mounted display (HMD), a locator and a calculation device. In the method, the calculation device executes an application of the VR to display frames of the application on the HMD, the calculation device then detects a moving direction of a user wearing the HMD in a three-dimensional (3D) space by using the locator, and finally, the calculation device fast moves a field of view (FOV) of the frames from a current location toward the moving direction.

In an embodiment of the invention, the step of fast moving the FOV of the frames from the current location toward the moving direction by the calculation device includes fast moving the FOV of the frames from the current location toward the moving direction in response to a trigger event of the fast moving operation by the calculation device.

In an embodiment of the invention, the trigger event includes a specific object appearing in the frames, a specific object appearing in an area outside the 3D space located by the locator in the frames, or a trigger operation of the user.

In an embodiment of the invention, the step of fast moving the FOV of the frames from the current location toward the moving direction by the calculation device includes determining a fasting moving distance according to a moving distance or a moving speed of the user in the 3D space.

In an embodiment of the invention, the step of fast moving the FOV of the frames from the current location toward the moving direction by the calculation device includes fast moving the FOV of the frames from the current location toward the moving direction until the FOV is located in front of the specific object in the moving direction by the calculation device.

A VR apparatus of the invention includes a HMD, a locator, a storage device and a calculation device. The locator is configured to locate a user wearing the HMD. The storage device is configured to record a plurality of modules. The calculation device is coupled to the HMD, the locator and the storage device and configured to access and execute the modules recorded in the storage device. The modules include a frame generation module, a motion detection module and a fasting moving module. The frame generation module executes an application of the VR to display frames of the application on the HMD. The motion detection module detects a moving direction of the user in a 3D space using the locator. The fasting moving module fast moves a FOV of the frames from a current location toward the moving direction.

In an embodiment of the invention, the fasting moving module fast moves the FOV of the frames from the current location toward the moving direction in response to a trigger event of the fast moving operation. The trigger event includes a specific object appearing in the frames, a specific object appearing in an area outside the 3D space located by the locator in the frames, or a trigger operation of the user.

In an embodiment of the invention, the fasting moving module determines a fasting moving distance according to a moving distance or a moving speed of the user in the 3D space.

In an embodiment of the invention, the fasting moving module fast moves the FOV of the frames from the current location toward the moving direction until the FOV is located in front of the specific object in the moving direction.

A non-transitory computer readable recording medium of the invention is configured to record a program loaded by a VR apparatus to execute steps as follows. An application of a VR is executed to display frames of the application on a HMD. Then, a moving direction of a user wearing the HMD in a three-dimensional space is detected by using the locator. Finally, a FOV of the frames is fast moved from a current location toward the moving direction.

To sum up, in the method, the VR apparatus and the recording medium for fast moving in the VR of the invention, the moving direction of the user in the 3D space is detected by using the locator, and the FOV of the VR frames viewed by the user is correspondingly fast moved toward the same direction, such that the user's vision can be in consistent with body perception to prevent or mitigate dizziness that may be caused when the frames move fast.

In order to make the aforementioned and other features and advantages of the invention more comprehensible, several embodiments accompanied with figures are described in detail below.

DESCRIPTION OF EMBODIMENTS

The invention is provided to facilitate a user in determining a direction to move by stepping out when the user needs to perform fast movement in a virtual reality (VR). A field of view (FOV) of frames is further controlled to fast move toward the moving direction in the VR through detecting the moving direction of the user. In this way, the moving direction of the frames can be in consistent with an acceleration direction perceived by the user's body, such that dizziness caused by the fast movement of the frames can be prevented or mitigated.

Figure 1:
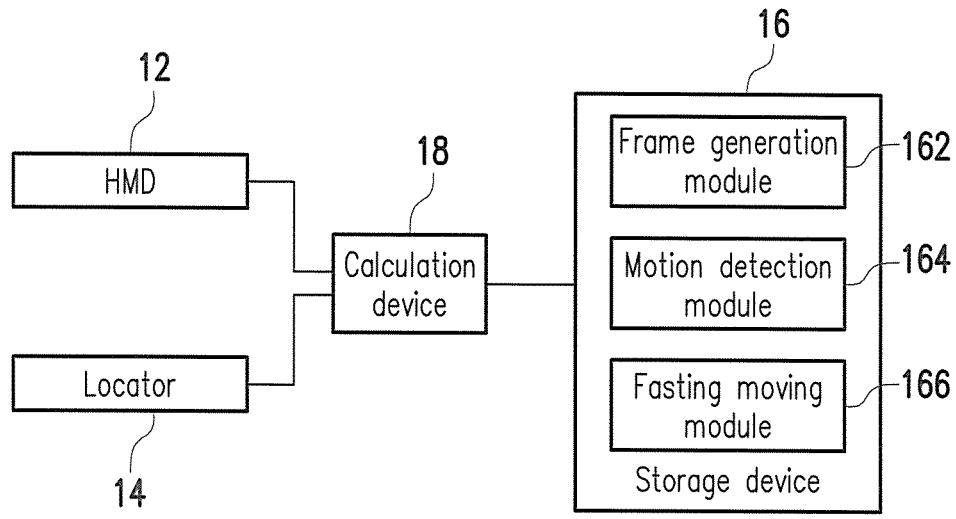
FIG. 1 is a block diagram illustrating a virtual reality (VR) apparatus according to an embodiment of the invention.

FIG. 1 is a block diagram illustrating a VR apparatus according to an embodiment of the invention. Referring to FIG. 1, a VR apparatus 10 of the present embodiment includes a head-mounted display (HMD) 12, a locator 14, a storage device 16 and a calculation device 18, and functions thereof are described below.

The HMD 12 is, for example, a liquid crystal display (LCD), a light-emitting diode (LED) display or any other adaptive display, which is manufactured in a helmet or an eyeglass form for a user to wear on his/her head. A sensor, such as a gravity sensor or a gyro is additionally disposed in the HMD 12. The sensor is capable of detecting head rotation or an inclination angle of the user's head and feeds back the same to the calculation device 18, such that the calculation device 18 may generate VR frames suitable for being viewed during the rotation or in the inclination angle and finally displayed on the HMD 12. In this way, the HMD 12 may display 360-degree VR frames, such that the user viewing the frames can experience like in the reality.

The locator 14 includes, for example, a laser or an infrared (IR) transmitter and receiver capable of detecting a distance of an object in a three-dimensional (3D) space and locating a position of the object in the 3D space with the use of a plurality of calibrators disposed on the object (e.g., the HMD 12). The locator 14 may be placed in a corner of an activity space of the user, which is capable of not only locating a position of the user in the 3D space, but also defining a border of the activity space. A position of the border may be displayed on the HMD 12 when the user approaches, and thereby, the user is prevented from walking out of the activity space or bumping into an object (e.g., a room wall) located outside the activity space.

The storage device 16 may be any type of fixed or movable random access memory (RAM), read only memory (ROM), flash memory, the like or a combination of the aforementioned elements. In the present embodiment, the storage device 16 is configured to record a frame generation module 162, a motion detection module 164 and a fasting moving module 166. The modules are, for example, programs stored in the storage device 16.

The calculation device 18 may be, for example, a computing device (e.g., a file server, a database server, an application server, a workstation or a personal computer (PC)) with computing capability and includes a processor. The processor is, for example, a central processing unit (CPU) or any other programmable microprocessor for general or special use, a digital signal processor (DSP), a programmable controller, an application specific integrated circuit (ASIC), a programmable logic device (PLD) or other similar devices, or a combination of these devices. The calculation device 18 is coupled to the HMD 12, the locator 14 and the storage device 16, and loads the frame generation module 162, the motion detection module 164 and the fasting moving module 166 from the storage device 16, so as to perform a method for fast moving in a VR of the invention.

It should be mentioned that in an embodiment, the storage device 16 and the calculation device 18 are disposed separately from the HMD 12, and coupled to the HMD 12 in a wired or a wireless manner for data transmission, while the storage device 16 is disposed in the calculation device 18. In another embodiment, the storage device 16 and the calculation device 18 may be integrated in the HMD 12, and connected with the HMD 12 through a transmission line for data transmission, which construe no limitations to the invention. An embodiment is provided below to elaborate detailed steps of the method for fast moving in the VR of the invention.

Figure 2:
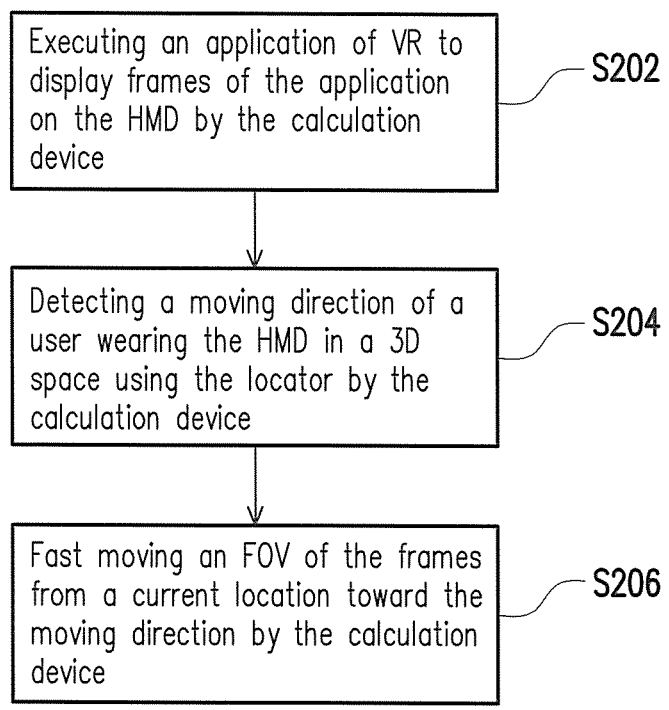
FIG. 2 is a flowchart illustrating a method for fast moving in a VR according to an embodiment of the invention.

FIG. 2 is a flowchart illustrating a method for fast moving in a VR according to an embodiment of the invention. Referring to FIG. 2, the method of the present embodiment is applicable to the VR apparatus 10 illustrated in FIG. 1, and detailed steps of the method for fast moving in the VR will be described with reference to each element in the VR apparatus 10 below.

First, the calculation device 18 executes the frame generation module 162 to execute an application of the VR to display frames of the application on the HMD 12 (step S202).

Then, the calculation device 18 executes the motion detection module 164 and detects a moving direction of the user in a 3D space using the locator 14 (step S204). The locator 14 is disposed, for example, in two opposite corners in a room to locate a position of the user in the room and provides the position to the calculation device 18. The locator 14, for example, locates a position of the HMD 12, a position of a joystick held by the user or a position of another device worn on the user's body, or locates by directly capturing an image containing the user, so as to locate the position of the user in the room. On the other hand, the calculation device 18 may determine a moving direction of the user in the room by analyzing positions of the user provided by the locator 14 during a period of time.

Then, the calculation device 18 executes the fasting moving module 166 to fast move a FOV of the frames from a current location toward the moving direction (step S206). Therein, the fasting moving module 166 fast moves the FOV of the frames from the current location toward the moving direction, for example, only in response to a trigger event of the fast moving operation, or executes a normal moving operation otherwise. The trigger event is, for example, a specific object appearing in the frames, a specific object appearing in an area outside the 3D space located by the locator 14 in the frames, or a trigger operation of the user, which is not limited in the invention.

Specifically, in order to distinguish whether the movement of the user is a normal movement or a fast movement, whether to execute the fast moving operation is determined according to the trigger event in the present embodiment. For example, in an embodiment, when a specific object appears in the frames, it is determined that the user attempts to fast move to a position of the specific object if the user moves toward the specific object, while the calculation device 18 fast moves the FOV of the frames in a direction from the current location toward the specific object. In another embodiment, only when a specific object appears in an area outside the 3D space located by the locator 14, the calculation device 18 executes the fast moving operation as the user moves toward the specific object, but does not execute the fast moving operation on the specific object appearing inside the 3D space. In yet another embodiment, the calculation device 18 executes the fast moving operation only when receiving a trigger operation of the user. The trigger operation refers to, for example, the user pressing a specific button on the joystick or making a specific gesture, which is not limited in the invention.

Besides the aforementioned conditions of triggering the fast moving operation, a fast moving distance is another factor to be considered. Specifically, in an embodiment, the calculation device 180 executes the fasting moving module 166, and determines the fasting moving distance according to a moving distance or a moving speed of the user in the 3D space. Briefly speaking, a distance or a speed of the pace taken by the user determines the fast moving distance of the FOV of the frames, i.e., as the pace taken by the user increases, the fast moving distance increases. In another embodiment, the calculation device 180 executes the fasting moving module 166, and fast moves the FOV of the frames from the current location toward the moving direction until the FOV is located in front of the specific object in the moving direction. For example, if a specific person appears in right front of the user, the user only needs to step out in a direction toward the specific person, and then, the FOV of the frames is fast moved toward the front of the specific person.

Figure 3A:
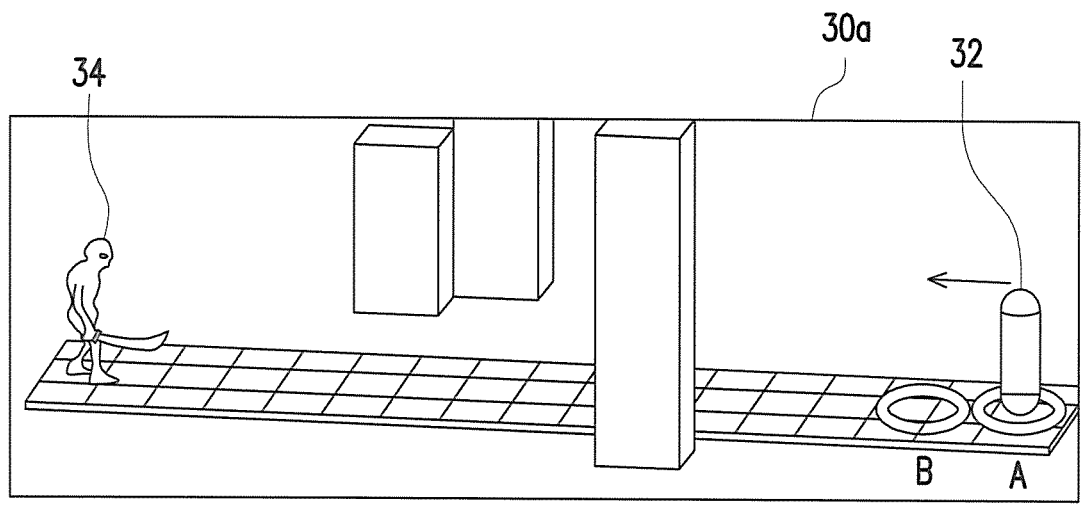
FIG. 3A and FIG. 3B illustrate examples of fast moving in the VR according to an embodiment of the invention.
Figure 3B:
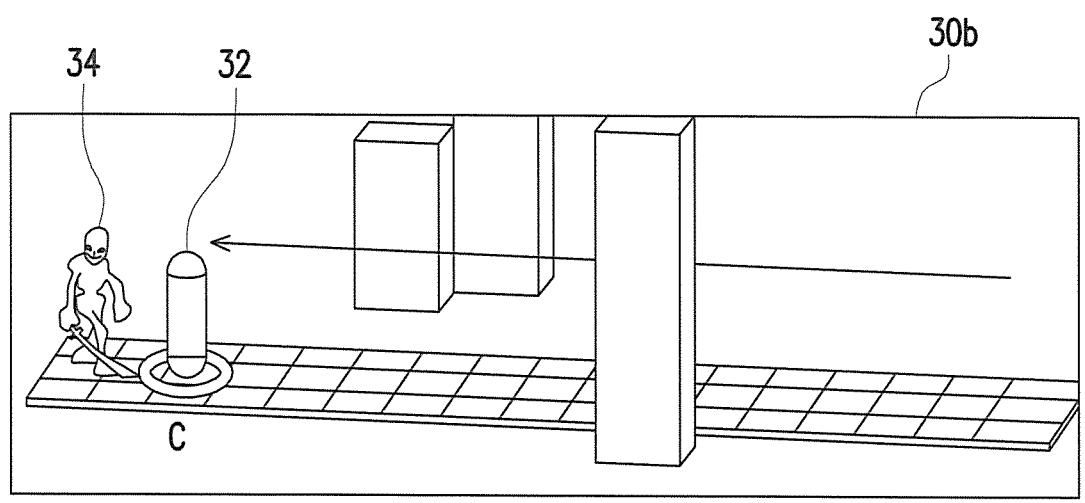

For example, FIG. 3A and FIG. 3B illustrate examples of fast moving in the VR according to an embodiment of the invention. FIG. 3A and FIG. 3B respectively illustrate battle screens 30a and 30b in an action game, which are used for describing how the user performs the fast moving operation through the method of the embodiment above. In FIG. 3A, a user wearing an HMD 32 moves toward a monster 34 in a direction from a position A to a position B. In this circumstance, the user fast moves to a position C in the battle screen 30b, i.e., in front of the monster 34. In the present embodiment, a movement of a center of gravity caused by the user stepping out and the movement of the frames are in the same direction, thereby preventing or mitigating dizziness due to the fast movement from occurring to the user.

The invention is further directed to a non-transitory computer readable storage medium recording a computer program configured to execute each step of the method for fast moving in the VR. The computer program is composed of a plurality of program sections (i.e. building an organization diagram program section, approving a list program section, setting a program section, and deploying a program section). After the program sections are loaded in the VR apparatus and executed, the steps of the method for fast moving in the VR can be completed.

Based on the above, the method, the VR apparatus and the recording medium for fast moving in the virtual reality of the invention can facilitate the user in stepping out toward the direction that he/she wants to move, so as to trigger the FOV of the VR frames to move fast to the same direction in the condition that the user needs to move fast in the VR. Thereby, as the movement of the center of gravity caused by the step taken by the user and the movement of the frames are in the same direction, the acceleration direction perceived by the user's body is also consistent with the vision direction, such that the dizziness caused by the fast movement can be prevented or mitigated.

Although the invention has been disclosed by the above embodiments, they are not intended to limit the invention. It will be apparent to one of ordinary skill in the art that modifications and variations to the invention may be made without departing from the spirit and scope of the invention. Therefore, the scope of the invention will be defined by the appended claims.

What is claimed is:

1. A method for fast moving in a virtual reality (VR), applicable to a VR apparatus comprising a head-mounted display (HMD), a locator and a calculation device, the method comprising:
   executing an application of the VR to display frames of the application on the HMD by the calculation device;
   detecting a moving direction and an acceleration direction of a user wearing the HMD in a three-dimensional (3D) space using the locator by the calculation device; and
   fast moving a field of view (FOV) of the frames from a current location toward the moving direction according to the acceleration direction by the calculation device,
   wherein the step of fast moving the FOV of the frames from the current location toward the moving direction by the calculation device comprises:
   determining a fasting moving distance according to a moving distance or a moving speed of the user n the 3D space.

2. The method according to claim 1, wherein the step of fast moving the FOV of the frames from the current location toward the moving direction by the calculation device comprises:
   fast moving the FOV of the frames from the current location toward the moving direction in response to a trigger event of the fast moving operation by the calculation device.

3. The method according to claim 2, wherein the trigger event comprises a specific object appearing in the frames, a specific object appearing in an area outside the 3D space located by the locator in the frames, or a trigger operation of the user.

4. The method according to claim 1, wherein the step of fast moving the FOV of the frames from the current location toward the moving direction by the calculation device comprises:
   fast moving the FOV of the frames from the current location toward the moving direction until the FOV is located in front of the specific object in the moving direction by the calculation device.

5. A virtual reality (VR) apparatus, comprising:
   a head-mounted display (HMD);
   a locator, locating a user wearing the HMD;
   a storage device, recording a plurality of modules; and
   a calculation device having a processor, coupled to the HMD, the locator and the storage device and configured to access and execute the modules recorded in the storage device by the processor for:
   executing an application of the VR to display frames of the application on the HMD;
   detecting a moving direction and an acceleration direction of the user in a three-dimensional (3D) space using the locator; and
   fast moving a field of view (FOV) of the frames from a current location toward the moving direction according to the acceleration direction, wherein the processor determines a fasting moving distance according to a moving distance or a moving speed of the user in the 3D space.

6. The VR apparatus according to claim 5, wherein the processor fast moves the FOV of the frames from the current location toward the moving direction in response to a trigger event of the fast moving operation.

7. The VR apparatus according to claim 6, wherein the trigger event comprises a specific object appearing in the frames, a specific object appearing in an area outside the 3D space located by the locator in the frames, or a trigger operation of the user.

8. The VR apparatus according to claim 5, wherein the processor fast moves the FOV of the frames from the current location toward the moving direction until the FOV is located in front of the specific object in the moving direction.

9. A non-transitory computer readable recording medium, recording a program to be loaded by a virtual reality (VR) apparatus to execute steps of:
- executing an application of a VR to display frames of the application on a head-mounted display (HMD) by a calculation device;
- detecting a moving direction and an acceleration direction of a user wearing the HMD in a three-dimensional (3D) space using a locator; and
- fast moving a field of view (FOV) of the frames from a current location toward the moving direction according to the acceleration direction by the calculation device,
- wherein the step of fast moving the FOV of the frames from the current location toward the moving direction by the calculation device comprises:
- determining a fasting moving distance according to a moving distance or a moving speed of the user in the 3D space.

* * * * *